C. C. FARMER.
SAFETY CAR CONTROL DEVICE.
APPLICATION FILED FEB. 14, 1920.
1,400,593.
Patented Dec. 20, 1921.
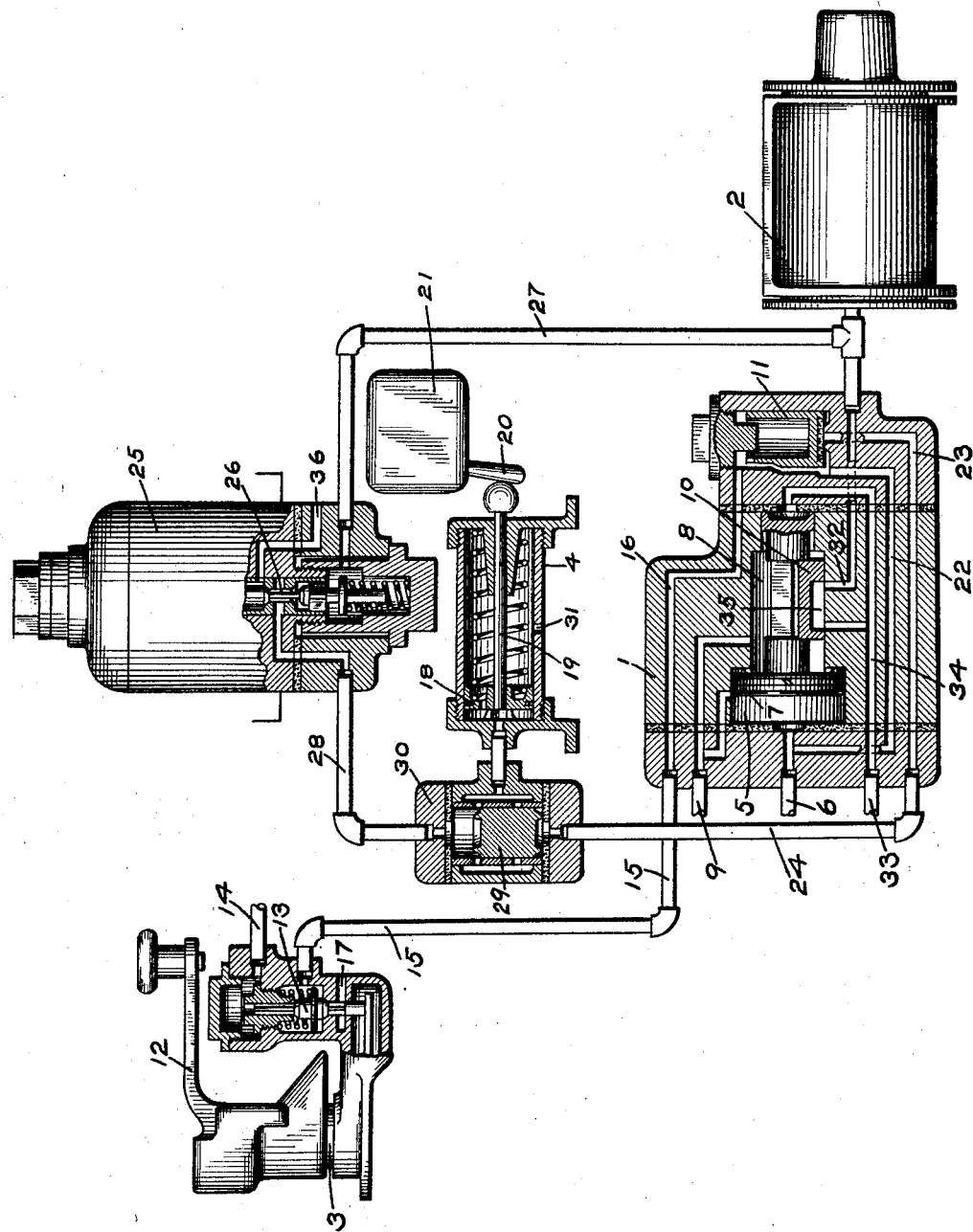
INVENTOR
CLYDE C. FARMER
BY *Wm. M. Brady*
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,400,593.  Specification of Letters Patent.  Patented Dec. 20, 1921.

Application filed February 14, 1920. Serial No. 358,605.

*To all whom it may concern:*

Be it known that I, CLYDE C. FARMER, a citizen of the United States, residing at Edgewood, in the county of Allegheny and State of Pennsylvania, have invented new and useful Improvements in Safety Car-Control Devices, of which the following is a specification.

This invention relates to traction car controlling devices, and more particularly to a safety car control equipment adapted for one man control of the car.

In safety car control equipments of the above character, provision is made so that if the operator leaves the car he must either make an application of the brakes or the brakes will be automatically applied when he removes his hand from the controller handle.

It is sometimes necessary for the operator to leave the car in order to replace the trolley wheel on the trolley wire and in such case he may make an application of the brakes but may neglect to return the controller handle to off position.

When the trolley wheel is replaced on the trolley wire with the controller handle in a power on position, current will be supplied to the car motors and in some cases the power of the motors may be sufficient to overcome the holding power of the brakes, resulting in a runaway car.

The principal object of my invention is to provide means for obviating the above described difficulty.

In the accompanying drawing, the single figure is a diagrammatic view, partly in section, of so much of a safety car control equipment as is deemed necessary to illustrate the application of my invention.

The equipment shown in the drawing comprises an emergency valve device 1, a brake cylinder 2, a safety controller handle device 3, and a circuit breaker controlling device 4.

The emergency valve device 1 may comprise a casing having a piston chamber 5, connected to an emergency brake pipe 6 and containing a piston 7, and a valve chamber 8, connected to a main reservoir or source of fluid pressure supply pipe 9 and containing a slide valve 10 adapted to be operated by piston 7.

The emergency valve casing may contain a relay valve 11 for controlling the venting of fluid under pressure from the brake pipe 6.

The car controller handle device 3 may comprise a handle 12 adapted to control a double beat pilot valve 13, so that when the handle 12 is held depressed, as shown in the drawing, the pilot valve 13 establishes communication from a fluid pressure supply pipe 14 to a pipe 15, which is connected by passage 16 to one side of the relay valve 11.

If the controller handle is released, the pilot valve 13 is operated to vent fluid from pipe 15 to an exhaust port 17.

The circuit breaker controlling device 4 may comprise a cylinder containing a piston 18 having a piston stem 19 adapted to engage the handle 20 of a circuit breaker 21.

For operating the piston 18, fluid pressure is supplied thereto when the relay valve 11 is opened to vent fluid from the brake pipe 6, through passage 22, passage 23 and pipe 24.

According to my invention, a magnet controlled valve device is provided comprising a magnet 25 connected in the power circuit of the car motor, so that the magnet will be energized whenever current is supplied to the motor and the magnet is adapted to operate a double beat valve 26 for controlling communication from a pipe 27 leading to the brake cylinder 2 to a pipe 28 through which fluid is supplied to the circuit breaker piston 18.

A double check valve 29, contained in a casing 30, controls communication from pipes 24 and 28 to the piston 18.

In operation, when the car is running, the magnet 25 is energized by current supplied to the car motor, and, as shown in the drawing, the double beat valve is then held in a position for connecting pipe 27 with pipe 28.

If the operator should release the controller handle 12 at any time, the pilot valve 13 will operate to vent fluid from pipe 15 and one side of the relay valve 11, so that said valve is operated to vent fluid from the emergency brake pipe 6, through passage 22 to passage 23 and pipe 24.

Fluid thus supplied to pipe 24 will shift the double check valve 29 so that communication is opened for admitting fluid to the piston 18, which is then operated to shift the piston stem 19 and the circuit breaker handle 20, so that the motor power circuit is opened.

When the piston 18 has moved out sufficiently to uncover the exhaust port 31, fluid is vented from the brake pipe 6 to the atmosphere and the piston 7 of the emergency valve device then actuates the slide valve 10 so as to uncover passage 32 and supply fluid under pressure from valve chamber 8 and the main reservoir to the brake cylinder 2, to effect an emergency application of the brakes.

If the trolley wheel should leave the trolley wire, the operator before leaving the car to replace the trolley wheel, may make a straight air application of the brakes by manipulation of the usual brake valve, so that fluid is supplied to the straight air pipe 33 and thence through passage 34, cavity 35 in slide valve 10 and passage 32 to the brake cylinder 2.

Since the trolley wheel is off the trolley wire, no current will flow to the car motors, and the magnet 25 will be deënergized.

The double beat valve 26 will then be operated so that communication from pipe 27 to pipe 28 is cut off, but communication is made from pipe 28 to exhaust port 36.

If the motorman leaves the car with the controller handle in a power on position and then replaces the trolley wheel on the trolley wire, the magnet 25 will be energized through the motor circuit to effect the operation of the double beat valve 26, so that fluid is supplied from the brake cylinder 2 through pipe 27 to pipe 28.

The double check valve 29 is then actuated to open communication from pipe 28 to the circuit breaker cylinder and the piston 18 is operated by fluid from the brake cylinder to shift the circuit breaker arm 20 and open the motor circuit.

It will now be evident that even if the operator has left the controller handle in a power on position, current will not be supplied to the car motors when the trolley wheel is replaced on the trolley wire, so that the danger of the car starting forward, without the operator at his post, is obviated.

If the operator, before leaving the car, returns the controller handle to off position as well as applies the brakes, then the magnet 25 will not be energized when the trolley wheel is replaced on the trolley wire and consequently the circuit breaker will not be operated.

Having now described my invention, what I claim as new and desire to secure by Letters Patent, is:

1. In a safety car control apparatus, the combination with a car motor circuit breaker, a cylinder, a piston therein for operating the circuit breaker, and a brake cylinder, of a magnet in the power circuit and valve means operated by said magnet for controlling communication from the brake cylinder to said cylinder.

2. In a safety car control apparatus, the combination with a car motor circuit breaker, a piston for operating said circuit breaker, a controller handle and means operated upon release of the controller handle for supplying fluid under pressure to said piston, of a magnet adapted to be energized when current is flowing to the car motors and valve means operated by said magnet for also supplying fluid under pressure to said piston.

3. In a safety car control apparatus, the combination with a car motor circuit breaker, a piston for operating said circuit breaker, a controller handle and means operated upon release of the controller handle for supplying fluid under pressure to said piston, of a magnet adapted to be energized when current is flowing to the car motors, valve means operated by said magnet for also supplying fluid under pressure to said piston, and a double check valve for controlling communication from said controller handle operated means and said magnet valve means to said piston.

In testimony whereof I have hereunto set my hand.

CLYDE C. FARMER.